United States Patent [19]

Carlson et al.

[11] 4,090,250
[45] May 16, 1978

[54] DIGITAL SIGNAL PROCESSOR

[75] Inventors: Curtis E. Carlson, Nashua, N.H.; Richard A. Johnson, Stow; Edward E. Spignese, Marblehead, both of Mass.

[73] Assignee: Raytheon Company, Lexington, Mass.

[21] Appl. No.: 728,662

[22] Filed: Sep. 30, 1976

[51] Int. Cl.² .................. G06F 15/00; G06F 15/50
[52] U.S. Cl. .................................................. 364/900
[58] Field of Search ........................................ 340/172.5

[56] References Cited

U.S. PATENT DOCUMENTS

| | | | |
|---|---|---|---|
| 3,593,313 | 7/1971 | Tomaszewski et al. | 340/172.5 |
| 3,763,475 | 10/1973 | Frankel et al. | 340/172.5 |
| 3,766,532 | 10/1973 | Liebel, Jr. | 340/172.5 |
| 3,909,799 | 9/1975 | Recks et al. | 364/200 |
| 3,969,724 | 7/1976 | Anderson et al. | 364/200 |
| 3,984,814 | 10/1976 | Bailey, Jr. et al. | 364/200 |

Primary Examiner—Gareth D. Shaw
Assistant Examiner—Thomas M. Heckler
Attorney, Agent, or Firm—Richard M. Sharkansky; Joseph D. Pannone

[57] ABSTRACT

A digital signal processor adapted for use in small, lightweight radar-guided missiles. The processor includes a scratch pad register section, an arithmetic-logic unit and a control section arranged to enable data stored in two different storage elements included in such register section to be operated on by the arithmetic-logic unit, the result of such operation to be stored in a third storage element included in the register section and the contents stored in a program counter register to be incremented by one or jumped to a predetermined address selectively in accordance with the result of the arithmetic operation, all during the execution of a single one of a plurality of stored control instructions.

7 Claims, 4 Drawing Figures

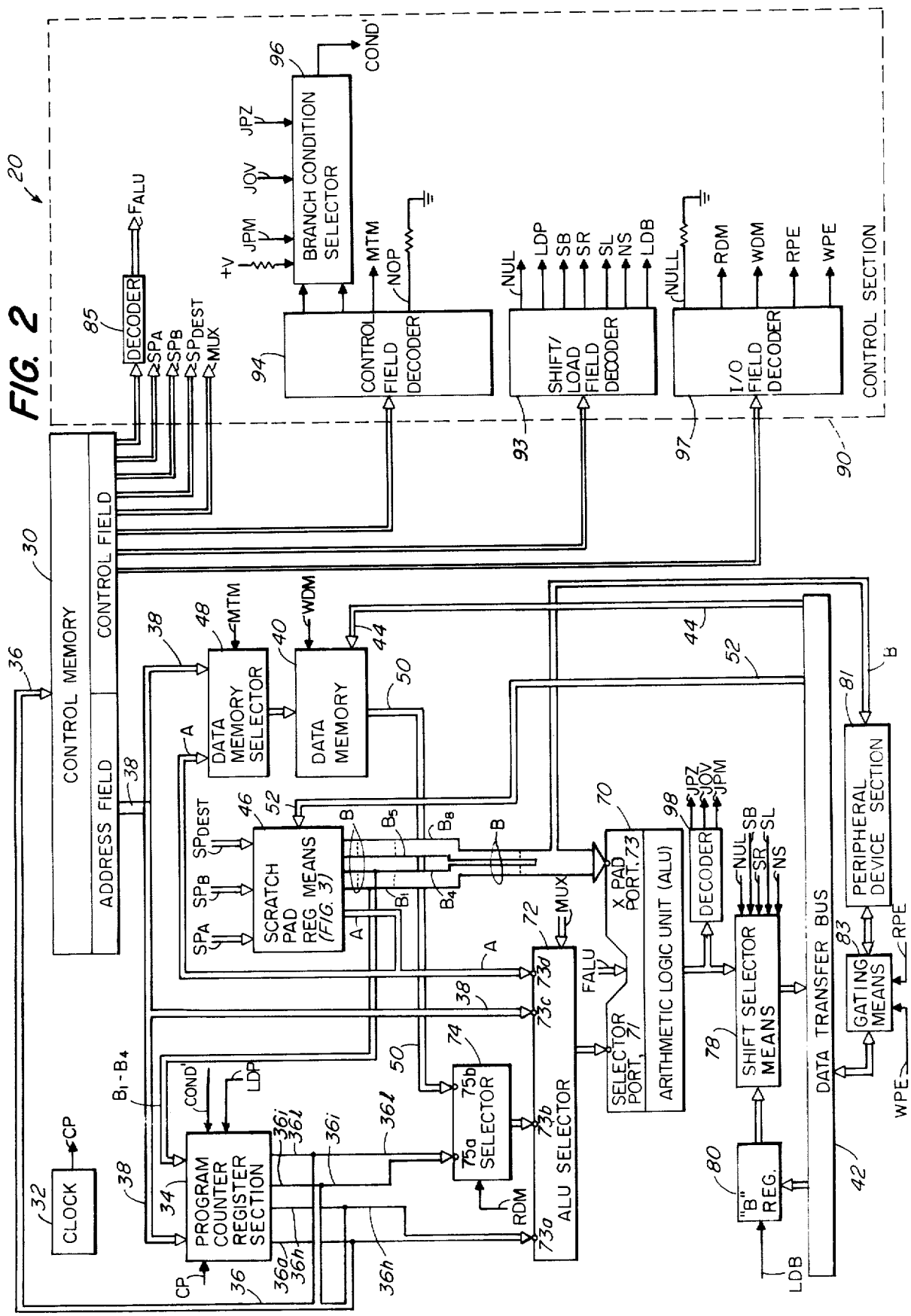

DIGITAL SIGNAL PROCESSOR

The invention herein described was made in the course of or under a contract or subcontract thereunder, with the Department of Defense.

BACKGROUND OF THE INVENTION

This invention relates generally to signal processors and more particularly to digital signal processors which are adapted for use in small lightweight radar-guided missiles.

As is known in the art, lightweight radar-guided missiles may be guided to a desired target by processing various received signals, such as radar echo signals, and applying such processed signals to the missile's flight control mechanism thereby to enable a successful intercept. Generally such a missile includes an autopilot for developing these proper flight control mechanism signals. Known autopilots include integrators and summing amplifiers which combine outputs from various missile mounted measuring instruments, such as gyros and accelerometers, in a desired manner to stabilize and guide the missile. In order for such an autopilot to operate efficiently over a wide range of aerodynamic conditions it is generally required that different gains and time constants of integrators and amplifiers be used when the missile travels in different regions of its operating range. Further, in known radar-guided missiles analog signal processing techniques are generally used to process radar echo signals. For example, a radar system generally detects a target in a noise or clutter environment by discriminating between the Doppler frequency of the target and the Doppler frequency of the noise or clutter. One technique which may be used in such frequency discrimination techniques is through the use of analog signal processing equipment which may include a swept local oscillator and an analog frequency tracking feedback control system.

The analog signal processing techniques used to process the echo signals and used in the autopilot to develop proper flight control mechanism signals are sometimes limited by the degree of their processing versatility and sophistication which may ultimately lead to an unsuccessful missile-target engagement. Many of these limitations may be overcome by using digital signal processing techniques; however, it is necessary that the digital signal processor operate in "real time" and have minimum weight and volume in order to be practical for application in a small lightweight radar-guided missile.

SUMMARY OF THE INVENTION

With this background of the invention in mind it is therefore an object of this invention to provide an improved digital signal processor for use in a small lightweight radar-guided missile.

This and other objects of the invention are attained generally by providing, in a digital signal processor, comprising: a control memory for storing a plurality of control instructions, each one having an address field and a control field; a program counter section for addressing such control memory; a control section for developing control signals in response to the control field of the addressed one of the control instructions and to signals produced by the signal processor; a data transfer bus; a register means having a plurality of storage elements for storing data on the data transfer bus into one of the storage elements selectively in accordance with the control signals, for coupling data stored in any one of such storage elements to a first output terminal of the register means selectively in accordance with the control signals, and for coupling data stored in any one of such storage elements to a second output terminal of such register means selectively in accordance with such control signals, the first output terminal being coupled to the program counter section; an arithmetic unit means, responsive to such control signals, for processing data applied to a pair of input terminals thereof selectively in accordance with such control signals, including means adapted to couple such processed data to the data transfer bus, a first oone of such pair of input terminals being connected to the second output terminal of the register means; a selector means for coupling to the second one of the pair of input terminals of the arithmetic unit, either data read from the program counter section or data coupled to the second output of the register means selectively in accordance with the control signals, and means responsive to the control signals, for enabling the program counter to store as the next address either the address specified by the address field of the addressed one of the control instructions modified by the data at the first output of the register means or the prior address of the program counter section incremented. With such arrangement data stored in two different storage elements may be operated on by the arithmetic unit means, the result of such operation may then be stored in a third storage element, and the program counter may be incremented or jumped selectively in accordance with such result, all during the execution of a single one of the stored control instructions.

BRIEF DESCRIPTION OF THE DRAWINGS

The foregoing features of this invention, as well as the invention itself, may be more fully understood from the following detailed description read together with the accompanying drawings in which:

FIG. 2 is a block diagram of a signal processor according to the invention;

DESCRIPTION OF THE PREFERRED EMBODIMENT

Figure 1:
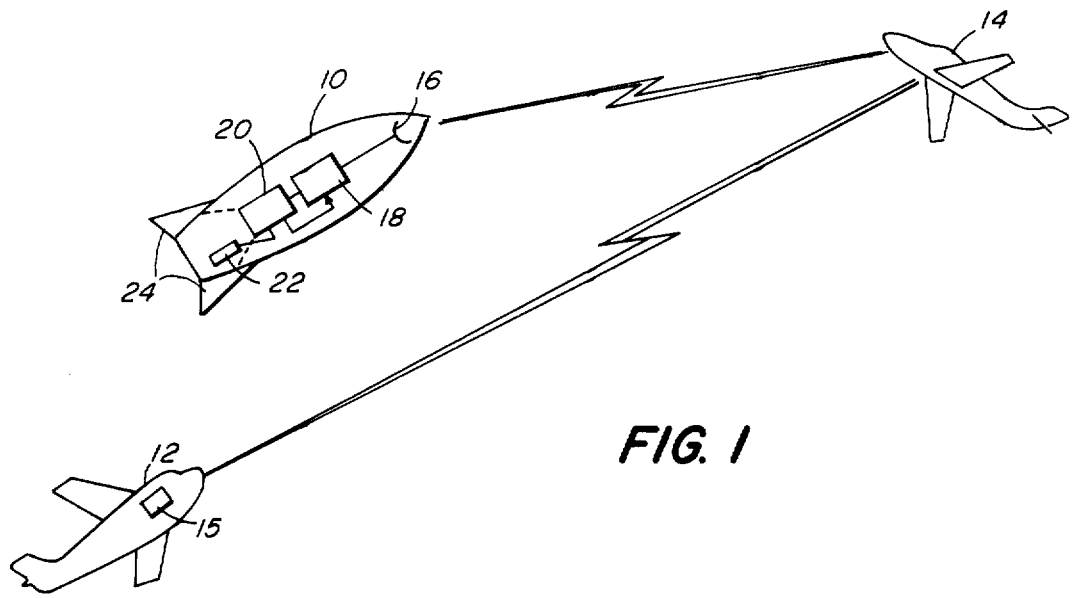
FIG. 1 is a sketch, somewhat simplified and greatly distorted, showing a radar-guided missile being directed to a target in accordance with control signals developed by a signal processor according to the invention.

Referring now to FIG. 1, a small lightweight radar-guided air-to-air missile 10 is shown launched from aircraft 12 and directed towards a target 14 in accordance with processed echo signals received by the missile's receiving antenna 16 in response to reflections from target 14 of radar pulses transmitted by a radar transmitted 15 carried by the aircraft 12. The received echo signals are passed through a conventional radar receiver 18. The signals produced for the radar receiver 18 together with the signals produced by gyros and accelerometers 22 mounted in the missile 10 are passed to a digital signal processor 20, the details of which will be discussed in connection with FIG. 2. Suffice to say here that such digital signal processor 20 converts the signal coupled thereto to digital signals, processes such digital signals in accordance with a stored program made up of a set of stored control instructions and thereby derives signals to tune the frequency of the receiver 18 to the Doppler frequency of the target return signals and to control the missile's control surfaces 24, which in turn aerodynamically direct the missile 10 to intercept the target 14.

Figure 3:
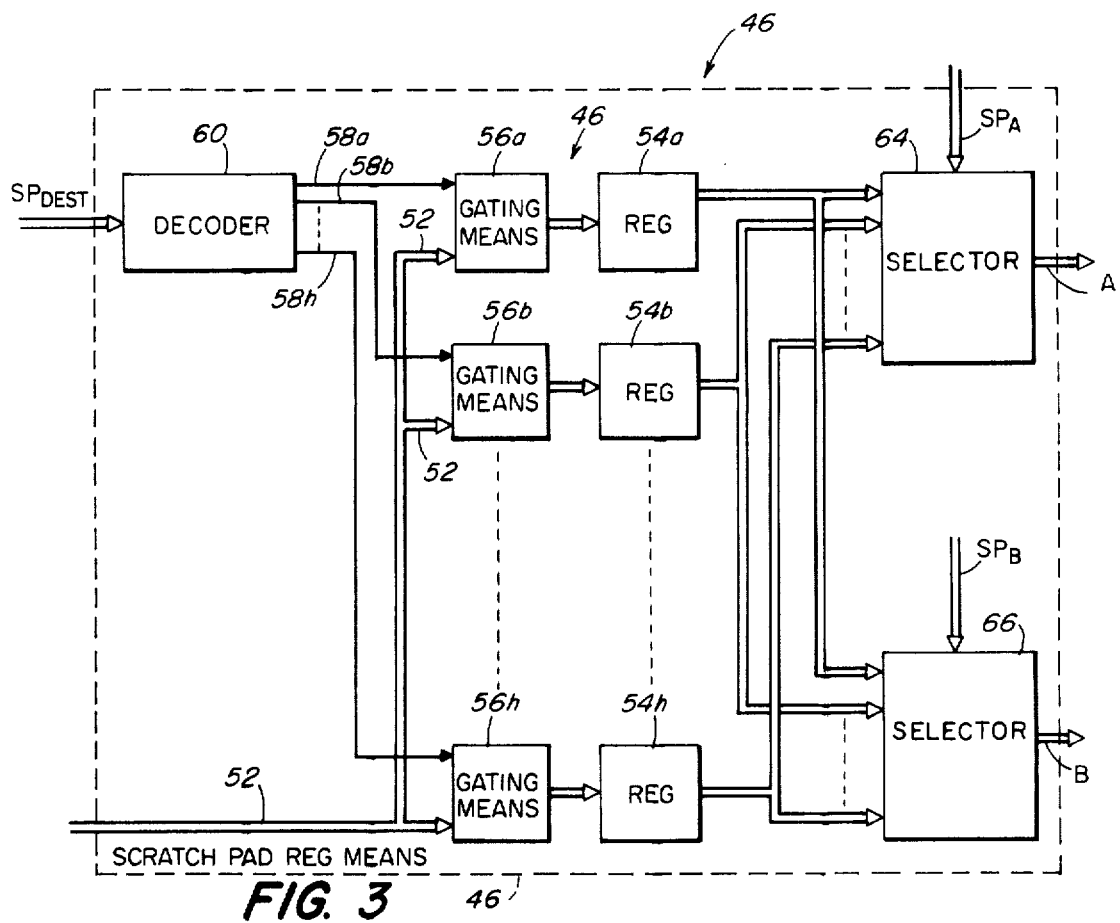
FIG. 3 is a block diagram of a register means used in the signal processor shown in FIG. 2.
Figure 4:
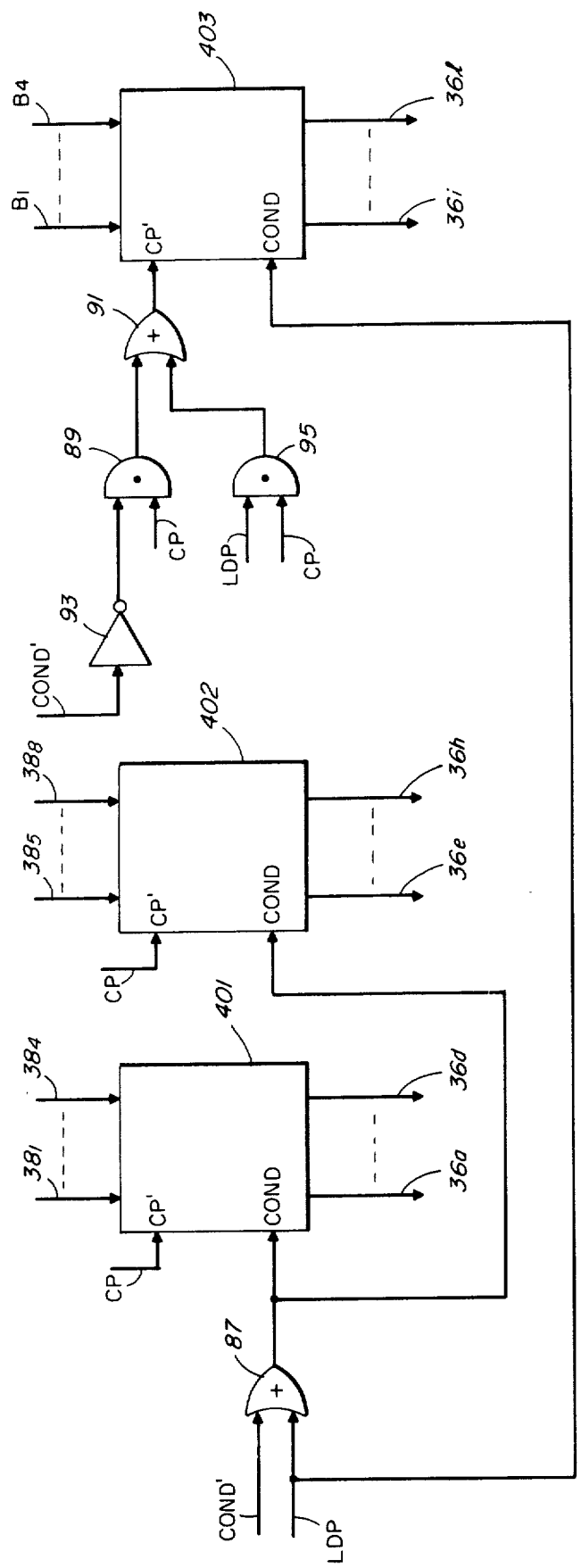
FIG. 4 is a block diagram of a program counter register section used in the signal processor shown in FIG. 2.

Referring now to FIG. 2, digital signal processor 20 is shown to include a control memory 30, here 4K by 36 bit programmable read only memory (PROM), for storing here 4096 control instructions, each having 36 bits. Each one of such instructions has an 8 bit address field and a 28 bit control field. The control memory 30 is here organized in 16 sections or pages, each section or page having, here, 256 control instructions. The processor 20 here is controlled by a 4.096 MHZ crystal clock 32. A program counter register section 34 here adapted to store a 12 bit digital word is provided to address the control memory 30 via bus 36. The four most significant bits (MSB's) of such 12 bit digital word stored in such program counter register section 34 provide the address for one of the 16 pages for memory 30 and the eight least significant bits (LSB's) of the 12 bit digital word stored in such register section 34 provide the address for one of the 256 control instructions in the page addressed by the four MSB's of such stored digital word. Program counter register section 34 includes three conventionally arranged four bit synchronous counters 401, 402, 403 (here SN 54S163 manufactured by Texas Instruments Incorporated, Dallas, Tex.) as shown in FIG. 4. As shown, each one of such counters 401, 402, 403 is adapted to either: increment its contents by one in response to both a clock pulse on terminal CP' and a "low" (or logical 0) signal on terminal COND; or to store the data applied thereto (i.e. data on lines $38_1 - 38_4$ for counter 401, on data lines $38_5 - 38_8$ for counter 402 and data on lines $B_1 - B_4$ for counter 403) in response to both a clock pulse on terminal CP' and a "high" (or logical 1) signal on terminal COND. Terminals COND of counters 401, 402 are connected to the output of OR gate 87. Such OR gate 87 is fed by a line LDP and a line COND'. Line LDP is fed to terminal COND of counter 403. Terminals CP' of counters 401, 402 are coupled to clock 32 via line CP. Terminal CP' of counter 403 is coupled to the output of AND gate 89 through OR gate 91. AND gate 89 is fed by line CP and is also coupled to line COND' through inverter 93 as shown. OR gate 91 is also fed by AND gate 95. AND gate 95 is fed by line CP and line LDP. The data on bus 38 (FIG. 2) is an eight bit digital word (i.e. made up of lines $38_1 - 38_8$) and is representative of the address field of the addressed control instruction and, when stored in register section 34, such eight bit word provides the eight least significant bits of the digital word stored in register section 34. The data of lines $B_1 - B_4$ is provided by scratch pad register means 46 (to the discussed in detail in connection with FIG. 3). Such data on lines $B_1 - B_4$ is a four bit word which, when stored in register section 34, provides the 4 MSB's of such stored word. It is noted that the 8 LSB's of the digital word stored in register section 34 are applied to lines $36a-36h$, the 4 MSB's are applied to lines $36i-36l$ and bus 36 contains lines $36a-36l$, as indicated. In operation, in response to a clock pulse, a "low" signal on line COND' and a low signal on line LDP, counters 401, 402, and 403 increment by 1. In response to a high signal on line LDP and a clock pulse, counters 401, 402 and 403 store the data on lines $38_1 - 38_4$, $38_5 - 38_8$ and $B_1 - B_4$, respectively. In response to a clock pulse, a low signal on line LDP and a high on line COND', counters 401, 402 store the data on lines $38_1 -$ $38_4$, $38_5 - 38_8$, respectively and the data in counter 403 does not change because a clock pulse cannot pass through AND gate 89 or AND gate 95 to terminal CP' of counter 403.

Scratch pad register means 46 (FIG. 2) is adapted to store data applied thereto from the data transfer bus 42 via bus 52. In particular, referring also to FIG. 3 such scratch pad register means 46 includes a plurality of, here 8, registers $54a-54h$. Each register $54a-54h$ is adapted to store an 8 bit word and is coupled to a corresponding one of a plurality of conventional gating means $56a-56h$. The data on bus 52 is coupled to each one of the gating means $56a-56h$, as shown. Each one of the gating means $56a-56h$ has coupled thereto a different enable line $58a-58h$ as shown. A decoder 60, in response to the control signal on bus $SP_{DEST}$, actuates one of the 8 enable lines $58a-58h$ thereby to enable data on bus 52 to pass through the enabled one of the gating means $56a-56h$. Each one of the eight registers $54a-56h$ is coupled to two selectors 64, 66 as shown. Bus $SP_A$ is coupled to a conventional selector 64. Bus $SP_B$ is coupled to a conventional selector 66. In response to control signals on bus $SP_A$, data stored in one of such registers $54a-54h$ appears on bus A and in response to control signals on bus $SP_B$, data in one of such registers $54a-54h$ appears on bus B. It is noted that bus B is made up of eight lines $B_1 - B_8$ (FIG. 2). The four LSB's of the content of the register coupled to such bus B is fed to lines $B_1 - B_4$. Such lines $B_1 - B_4$ are fed to program register section 34 as discussed. The full 8 bit bus B is fed to ALU 70 and peripheral device section 81, to be described.

Referring again to FIG. 2, data memory 40, here of any conventional random access memory, is provided to store 8 bit data supplied thereto from data transfer bus 42, via bus 44, as shown. The data memory 40 is addressed from either the scratch pad register means 46 (via bus A) or the address field of the addressed control instruction (via bus 38) selectively in accordance with the control signal on line MTM. In particular, when line MTM is "high" the address field of the addressed control instruction passes through a data memory selector 48 (via bus 38) to address the data memory 40 and when such line is "low" data from scratch pad and register means 46 passes through the selector 48 (via bus A) to address the data memory 40. In response to a "high" signal on line WDM data is written into the data memory 40 at the location specified by the data coupled through the data memory selector 48.

An arithmetic logic unit (ALU) 70, here two conventionally arranged SN54181 components manufactured by Texas Instrument Inc., is also provided. Such ALU 70 has two input ports: a selector port 71 and scratch pad (or xpad) port 73, as indicated. The xpad port 73 is directly coupled to bus B (i.e. lines $B_1 - B_8$) of the scratch pad register means 46. The selector port 71 is coupled to the output of ALU selector 72. The ALU selector 72 has four input ports $73a-73d$, as indicated. A selected one of the four input ports $73a-73d$ is coupled to selector port 71 in accordance with the control signals on bus MUX. Input port $73a$ is coupled to the eight LSB's of the contents stored in program counter register section 34 via lines $36a-36h$. Input port $73b$ is coupled to the output of selector 74. Selector 74 has two inputs, $75a$, $75b$. A selected one of such two inputs $75a$, $75b$ is coupled to the output thereof selectively in accordance with the control signal on line RDM. In particular, when the control signal on line RDM is "low" the four MSB's (plus 0000 to form an 8 bit word) of the contents stored in the program counter register means 34 is coupled to port 73b (via lines 36i–36l) and when the control signal on line RDM is "high" the data read from data memory 40 is coupled to port 73b via bus 50. Input port 73c of ALU selector 72 is coupled to the address field of the addressed control instruction. Input 73d of ALU selector 72 is coupled to the scratch pad register means 46 via bus A. The relationship between the control signals on bus MUX and the one of the four input ports which is coupled through ALU selector 72 to selector port 71 is described as follows:

| Control signals on bus MUX | Input port coupled to output of ALU selector 72 |
|---|---|
| 00 | Input port 73d |
| 01 | Input port 73a |
| 10 | Input port 73b |
| 11 | Input port 73c |

The ALU 70 processes data applied to the selector port 71 and the xpad port 73 in accordance with control signals on bus FALU. The processed data is adapted to be coupled to data transfer bus 42 via a shift selector means 78. Shift selector means 78 is of any conventional design and is adapted to shift data applied thereto in accordance with control signals on no shift line, NS, shift right line, SR, shift left line, SL, couple B register line, SB. In response to a signal on line NUL, the data at the output of the shift selector means 78 is not passed to the data transfer bus 42, that is the output of the shift selector means 78 includes here an open collector gate (not shown) which, when line NUL is, say, "high" decouples the data passed to such shift selector means 78 from the data transfer 42. Also, when the control signal on line SR is "high" data passed to shift selector 78 from ALU 70 is shifted to the right, one bit. When the control signal on line SL is "high" data passed to shift selector from ALU 70 is shifted to the left, one bit. When the control signal on line NS is "high" the data passed from ALU 70 is not shifted. When the line SB is "high" data stored in register 80 (i.e. the "B" register) passes through the shift selector means 78 unshifted to the data transfer bus 42. As is known, such shift selector 78 is used in performing, inter alia, multiplication and division operations.

The register 80, here sometimes hereinafter referred to as a "B" register, is an independent storage register generally used in multiplication and division processing where double precision words require additional storage. Such register 80 is loaded with data on the data transfer bus 42 in response to a "high" signal on line LDB. Data stored therein is routed to the data transfer bus 42 via shift selector means 78 when line SB is high as described above. Selected external peripherals, here signals to and from the radar receiver 18, the missile's control surfaces 24, and the gyros and accelerometers 22 (FIG. 1) are here considered as being included in peripheral device section 81. After being converted to digital signals by conventional analog-to-digital converters, not shown, the digital data of a selected one of such external peripherals (here such one being selected by the 8 bit digital word on bus B) is passed to data transfer bus 42 when lines RPE is "high". Likewise, after conversion to an analog signal by conventional digital-to-analog converters (not shown), digital data on such data transfer bus 42 is passed to a selected one of the external peripheral device (here such one being selected by the word on bus B) when line WPE is "high". Conventional gating means 83 passes data between the data transfer bus 42 and the peripheral device section 81 in response to the signal on lines WPE, RPE, as described.

A control section 90 is provided for developing, in response to the control field of the addressed one of the control instructions and signals produced by the processor 20, the control signals for such processor 20. In particular the control field of each control instruction may be represented as follows:

CONTROL FIELD

| Bits | 0–3 | 4 | 5–7 | 8–10 | 11–14 | 15–18 | 19–20 | 21–24 | 25–27 |
|---|---|---|---|---|---|---|---|---|---|
| | Arith | S P A R E | xpad Bus "A" | xpad Bus "B" | xpad Dest | Shift Load | Mux | Control | Input |
| | Logical | | | | | | | | Output (I/O) |

(It should be noted that bits 28–35 of the control instructions represent the address field of such control instructions.)

The arithmetic/logical operations are specified by bits 0–3 of the control instructions. This portion of the control field is, after passing through a decoder 85, coupled to ALU 70 via bus FALU.

The typical arithmetic/logical operations are summarized below:

| MNEMONIC | DESCRIPTION |
|---|---|
| ICS | Increment Selector Port. ALU 70 output = selector port 71 plus 1. |
| DCS | Decrement selector Port. ALU 70 output = selector port 71 input minus 1. |
| XPO | Scratch Pad xpad Port to Output. ALU 70 output = xpad port 73 input. |
| OCS | Ones Complement Selector Port. ALU 70 out-put = selector port 71 input, ones complemented. |
| SPO | Selector Port to Output. ALU 70 output = selector port 71 input. |
| ADD | Add. ALU output = selector port 71 input plus scratch pad port 73 input. |
| SUB | Subtract. ALU 70 output = selector port 71 input minus scratch pad port 73 input. |
| AND | AND. ALU 70 output = logical and of selector 71 and scratch pad port 73 port inputs. |
| IOR | Inclusive OR. ALU 70 output = inclusive "OR" of selector 71 and scratch pad 73 port inputs. |
| XOR | Exclusive OR. ALU 70 output = exclusive OR of selector 71 and scratch pad port 73 inputs. |
| TCX | Twos Complement Scratch Pad Port. ALU output = 2s complement of scratch pad port input 73. |

Bit 4 of the control field is a spare bit. Bits 5–7 are coupled to the scratch pad register means 46 via bus $SP_A$ and couple one of 8 registers 54a–54h to bus A as described in connection with FIG. 3. Such selection is made in accordance with the following table:

TABLE 1

| $SP_A$ | Register coupled to Bus A |
|---|---|
| 000 | Register 54a |
| 001 | Register 54b |
| . | . |
| . | . |
| . | . |

TABLE 1-continued

| SP$_A$ | Register coupled to Bus A |
|---|---|
| 111 | Register 54h |

Bits 8-10 of the control field are coupled to the scratch pad register means 46 via bus SP$_B$ and couple one of 8 registers 54a–54h to bus B as described in connection with FIG. 3. Such selection is made in accordance with the following table:

TABLE 2

| SP$_B$ | Register coupled to Bus B |
|---|---|
| 000 | Register 54a |
| 001 | Register 54b |
| . | . |
| . | . |
| 111 | Register 54h |

Bits 11-14 of the control field of the addressed control instruction are coupled to the scratch pad register means 46 via bus SP$_{DEST}$ and select one of the 8 registers 54a–54h which will store data on bus 52 as described in connection with FIG. 3. Such selection is made in accordance with the following table:

TABLE 3

| SP$_{DEST}$ | Gating means Enabled |
|---|---|
| 1000 | Gating means 56a |
| 1001 | Gating means 56b |
| . | . |
| . | . |
| 1111 | Gating means 56h |

The shift/load portion of the control field, i.e. bits 15-18 of the addressed control instruction, is used to specify the shift or the load operations. The shift/load portion of the control field is fed to a shift/load decoder 93. In response to such fields, control signals are developed on lines coupled to the output of such decoder 93. Typical ones of such control signals may be summarized as follows:

| Code Representation of shift/load Operation | Line which goes "high" in response to code | Description |
|---|---|---|
| 0000 | NUL | Decouples data at output of shift selector means 78 from data transfer bus 42 |
| 0001 | LDP | Unconditionally load program counters 401, 402, 403 with contents on bus 38 and lines B – B$_4$ (Such "high" signal passes to terminal COND' of counters 401, 402, 403 and also allows a clock pulse to pass through AND gate 95, and OR gate 91 terminal CP' of counter 403.) |
| 0010 | LDB | Load B register from data transfer bus 42. |
| 0011 | SB | Allow data stored in B register to pass through shift selector means 78 to data transfer bus. |
| 0100 | SR | Shift data at output of ALU 70 one bit to the right and pass shifted data to data transfer bus 42 |
| 0101 | SL | Shift data at output of ALU 70 one bit to the left and pass shifted to data transfer bus 42. |
| 0110 | NS | Pass data from ALU 70, unshifted, to data transfer bus 42 |

| Code Representation of shift/load Operation | Line which goes "high" in response to code | Description |
|---|---|---|
|  |  | unshifted, to data transfer bus 42 |

The Mux portion of the control field (i.e. bits 19-20) is coupled to the ALU selector 72 via bus MUX. The operation of the ALU selector 72 in response to the signals on such bus MUX has been described above.

The input/output portion of the control field (i.e. bits 25-27) is passed to an input/output (I/O) decoder 97. The control signals provided by such decoder 97 in response to the input/output portion of the control field may be summarized below:

| Code of Input/Output Field Portion | Operation "high signal" produced on line specified | |
|---|---|---|
| 000 | NULL | (no operation) |
| 001 | RDM | contents of data memory 40 on bus 50 passes to ALU 70 selector port 73b via selector 74 |
| 010 | WPE | data on transfer bus 42 is passed to a peripheral device selected by data on bus B |
| 011 | WDM | write into data memory 40 |
| 100 | RPE | digital output of peripheral selected by data on bus B is passed to data to data transfer bus 42 |

The control portion of the control field (i.e. bits 21-24 of the addressed control instruction) is passed to a control field decoder 94. Typical signals developed by the control field portion may be summarized as follows:

| Code | Description |
|---|---|
| 0000 | NOP - no operation |
| 0001 | Jump conditionally, line COND' of branch condition selector 96 goes "high", passes through OR gate 87 to terminals COND of counters 401, 402 and, on clock pulse, the program counter register section 34 jumps and stores data on bus 38 (Therefore the unconditional "jump" is done in a selected or current page because the high on line COND' prevents a clock pulse from passing through AND gate 89 to terminal CP' of counter 403 assuming line LDP is low, and therefore the contents of counter 403 do not change). |
| 0010 | Jump on zero. The line JPZ, which is "high" when decoder 98 indicates that the output of ALU 70 is zero, becomes coupled through the branch condition selector 96 to line COND'. The "high" signal on line COND' passes through OR gate 87 and, on clock pulse, program counter register section 34 "jumps" within the current page, as described above. Here, however, such "jump" is conditional. |
| 0011 | Jump on Minus. The line JPM, which is "high" when decoder 98 indicates the output of ALU 70 is negative, becomes coupled through the branch condition selector 96 to line COND'. |
| 0100 | Jump on overflow. The line JOV, which is "high" when decoder 98 indicates the ALU is overflowed, becomes coupled through the branch condition selector 96 to line COND'. |
| 0101 | Line MTM goes "high" and the address field on bus 38 passes through the data memory selector 48 to provide the address for data memory 40. |

More specifically, in response to code 0001, branch condition selector 96 selectively couples a +V voltage source (i.e. high signal) to line COND', and an unconditional branch condition exists. Thus the program counter register section 34 unconditionally stores as its 8 LSB's the address field of the addressed control instruction but continues to store its 4 MSB's (i.e. contents of counter 403) since AND gate 89 is disabled (and assuming line LDP is "low", AND gate 95 is disabled) and hence the control memory 30 will "jump" to the address specified by such address field within the current page rather than incrementing to the next sequential control instruction. In response to the code 0010, line JPZ becomes coupled to the line COND' and hence if the output of ALU is zero, line JPZ is "high" (as provided by decoder 98) and line COND' is high. Therefore, the program counter register section 34 will again "jump" or branch within the current page rather than increment as described. If line JPZ is "low" the ALU 70 is not zero, line COND' will be low and (if line LDP is low) the program counter register section 34 will increment by one. (It is noted that when line COND' is low AND gate 89 is enabled and a clock pulse can pass to terminal CP' of counter 403). Therefore, code 0010 is a conditional "jump" code as distinguished from use of code 0001 which is an unconditional "jump" code. Likewise, codes 0011,0100, are conditional "jump" codes and the control memory 30 will jump depending on the conditions of line JPM, and JOV, respectively. Code 0000 is a "no operation" code and therefore, since line COND' is low, the program counter register section 34 will increment by one (if line LDP is "low").

Consider the following example: It is desired that data from a selected peripheral (as specified by the contents of register 54b) be added to the data stored in the data memory 40 (such data being stored in the data memory at a particular address, $A_1$). If the ALU 70 overflows in performing such an arithmetic operation the program counter register section 34 is to "jump" to address a control instruction in the current page or section by the counter 403, the particular address in such page to be specified by the address field of the control instruction, here such address being $A_2$. If the ALU 70 does not overflow the program counter register section is to increment to address the next sequential control instruction. The generated sum produced by ALU 70 is to be stored in the register means 46. The example may be executed using the following sequence of control instructions:

| arith/<br>logical | xpad<br>bus<br>"A" | xpad<br>bus<br>"B" | xpad<br>Dest | shift<br>load | MUX | Cont. | I/O | ADDRESS FIELD |
|---|---|---|---|---|---|---|---|---|
| — | — | 001 | 1000 | 0000 | — | 0000 | 100 | — |
| SPO | — | — | 1010 | 0110 | 10 | 0101 | 001 | $A_1$ |
| ADD | 000 | 010 | 1011 | 0110 | 00 | 0100 | 000 | $A_2$ |

In response to the first control instruction the contents of register 54b sections one of the external peripherals and the digitized data from such selected peripheral becomes stored in register 54a. The program counter register section 34 increments to the next sequential control instruction. In response to such control instruction the contents of the data memory 40 at location $A_1$ passes through ALU 70 and the data transfer bus 42 to be stored in register 54c. The program counter register section 34 increments to the next sequential control instruction. In response to such control instructions the data in register 54a (i.e. the data from the selected peripheral) becomes added to the data in register 54c (i.e. the data from the data memory 40) and the result becomes stored in register 54d. If the ALU 70 overflows the program counter register section 34 jumps to address a control instruction in the current page at a location in such page specified by the address field, i.e. address $A_2$. If the ALU 70 does not overflow the program counter register section 34 increments to the next sequential control instruction. It is noted that in the execution of the last discussed control instruction data stored in two registers (i.e. register 54a and 54c) of the scratch pad register means 46 are processed in the ALU 70, the result stored in a third register (i.e. register 54a and 54c) of the scratch pad register means 46 are processed in the ALU 70, the result stored in a third register (i.e. register 54d) of such scratch pad register means 46 and the program incremented or jumped depending on the results formed in the ALU 70. The ability of the signal processor to conditionally jump and perform an arithmetic function at the clock rate, here 4.096MZ, enables such processor to operate in "real time".

Having described a preferred embodiment of this invention, numerous variations and modifications will now become apparent to one of skill in the art. It is felt, therefore, that such invention should not be limited to such embodiment but rather should be limited only by the spirit and scope of the appended claims.

What is claimed is:

1. In a digital processor having: a control memory for storing a plurality of control instructions, each one having an address field and a control field; a program counter section for addressing such control memory in accordance with the contents stored in such control memory section; a control section for developing control signals in response to the control field of the addressed one of the control instructions and to condition signals; a data transfer bus; an arithmetic unit means responsive to the control signals for processing data applied to a pair of input terminals of such arithmetic unit means, such data being processed selectively in accordance with such control signals; means for coupling such processed data to the data transfer bus; and means coupled to the output of the arithmetic unit for producing the condition signals in accordance with the data processed by the arithmetic unit means, the improvement comprising:

(a) a register means comprising:

(i) a plurality of storage elements;
(ii) input addressing means for enabling data on the data transfer bus to be stored into one of such storage elements selectively in accordance with the control signals;
(iii) first output means for coupling data stored in any one of such storage elements to a first output terminal of such register means selectively in accordance with the control signals; and
(iv) second output means for coupling data stored in any one of such storage elements to a second output terminal of such register means selectively in accordance with the control signal and wherein the first output terminal of the register means is coupled to one of the pair of input terminals of the arithmetic unit means;
(b) means for coupling data on the first output terminal of the register means to the program counter section;
(c) selector means having one input terminal connected to the program counter section and a second input terminal connected to the second output terminal of the register means for coupling either the program counter section or the second output terminal of the register means to the second one of the pair of input terminals of the arithmetic unit means selectively in accordance with the control signals; and
(d) means, responsive to the control signals and the condition signals, for enabling the program counter section to store as the next address for the control memory either: (1) the prior contents stored in the program counter incremented or (2) an address comprising the address field of the currently addressed control instruction and the data on the first output terminal of the register means selectively in accordance with the condition signal.

2. The improvement recited in claim 1 wherein the input addressing means includes:
(a) a plurality of gating means coupled to the plurality of storage elements, such gating means being fed by the data transfer bus; and,
(b) a decoder means, coupled to the plurality of gating means and responsive to the control signals, for enabling one of such gating means to pass data on the data transfer bus to one of the storage elements selectively in accordance with such control signals.

3. The improvement recited in claim 2 including a data memory and means for coupling the output of such data memory to the second one of the pair of input terminals of the arithmetic logic unit.

4. The improvement recited in claim 3 including means for enabling such data memory to be addressed by either the address field of the addressed control instruction or data coupled to the second output terminal of the register means selectively in accordance with the control signals.

5. The improvement recited in claim 1 including means for coupling the address field of the addressed control instruction to the program counter section.

6. The improvement recited in claim 5 including means for enabling the program counter section to store the data on the first output terminal of the register means.

7. The improvement recited in claim 5 including means for enabling the program counter section to store, as a portion of the contents stored therein, the address field of the addressed control instruction, and to remain unchanged a second portion of the contents stored in such register section.

* * * * *